United States Patent [19]

Rumayor-Aguirre et al.

[11] 4,424,925
[45] Jan. 10, 1984

[54] PROCESS AND MACHINE FOR SIMULTANEOUSLY CUTTING OFF EXCESS ENDS OF HOLLOW GLASS, PLASTIC OR SIMILAR ARTICLES

[75] Inventors: Hugo Rumayor-Aguirre, Garza Garcia; Abel Gomez-Sanchez; Jesus Viramontes-Romo, both of Monterrey, all of Mexico

[73] Assignee: Cristaleria, S.A., Monterrey, Mexico

[21] Appl. No.: 263,004

[22] Filed: May 12, 1981

[30] Foreign Application Priority Data

May 15, 1980 [MX] Mexico .................................. 182338

[51] Int. Cl.$^3$ ............................................. C03B 33/06
[52] U.S. Cl. ...................................... 225/2; 225/93.5; 225/96; 225/97; 225/101
[58] Field of Search ....................... 225/2, 96, 97, 101, 225/93.5

[56] References Cited

U.S. PATENT DOCUMENTS

| 610,588 | 9/1898 | Schrader | 225/93.5 |
|---|---|---|---|
| 1,908,303 | 5/1933 | Beatty | 225/93.5 |
| 2,410,931 | 11/1946 | Eisler | 225/93.5 |
| 2,641,870 | 6/1953 | Eisler | 225/93.5 |
| 2,729,031 | 1/1956 | Wolf | 225/93.5 |
| 3,506,171 | 4/1970 | Rupert | 225/97 X |
| 3,977,585 | 8/1976 | Sagorski | 225/101 |
| 4,044,936 | 8/1977 | Obersby et al. | 225/93.5 X |

*Primary Examiner*—Frank T. Yost
*Attorney, Agent, or Firm*—Charles Richard Werner; William H. Maxwell

[57] ABSTRACT

A process and machine, as a separate or integral part of a process and machine for manufacturing glassware, plastic or similar articles, adapted for the specific purpose of simultaneously cutting off excess ends of hollow glass, plastic or similar articles such as tubes enlarged at their mid-portion, comprising means for rotationally supporting the mid-portion of said articles either vertically or horizontally; thermal, electromagnetic or mechanical cutting means movable into and out of cutting relation with the excess ends of the article, rotatable grippers synchronized with the supporting means for rotationally gripping one or both excess ends during cutting of same and being adapted to exert a slight outward axial force at a predetermined rate on said excess ends until the cutting action is completed, and to release the excess ends to gravitate to a scrap collector before or after removal of the finished article.

15 Claims, 9 Drawing Figures

PROCESS AND MACHINE FOR SIMULTANEOUSLY CUTTING OFF EXCESS ENDS OF HOLLOW GLASS, PLASTIC OR SIMILAR ARTICLES

BACKGROUND OF THE INVENTION

I. Field of the Invention

The present invention refers to the cutting of hollow articles made of glass, plastic and the like and, more specifically, to a process and machine for simultaneously cutting off the excess ends of hollow, semi-finished glass articles, such as the tubes enlarged at their mid portion, for the so-called "oil lamps", said invention being adapted for inclusion as part of the article forming process and machines for the continuous production of such articles.

The process comprises, in combination, the stages of: retaining and/or holding the semi-finished article vertically, horizontally or rotationally by the portion of the article intermediate its ends; rotationally holding at least one of excess ends of the semi-finished article, in synchronism with the rotational retention and/or holding of the middle portion thereof; simultaneously beginning the thermal, electromagnetic or mechanical cutting off of both excess ends of the article; lightly pulling at a predetermined rate and in synchronism with the cuts, at least one of the rotationally-retained ends, and when both cuts are finished, free the retained surplus pieces, to fall by gravity to a surplus collector, before or after the finished article has been withdrawn.

The machine comprises, in combination: a rotary support and/or holding base hereinafter named impeller, suitable for placing and/or holding vertically or horizontally or rotationally a semi-finished article by the portion intermediate its ends; two cutters, either thermal, electromagnetic or mechanical, located at the height of the excess portions it is desired to cut off and, if desired, rounding the cut ends of the article; a surplus collector wherein the surplus portions fall and are collected; at least one rotary holder that turns in synchronism with the impeller and which holds and slightly pulls, at a predetermined speed and in sychronism with the cutting operation, at least one of the excess ends of the article in such a manner that, when both cutters finish the cutting operation and, if desired, the rounding or edging work, release the surplus portions to fall by gravity to the collector.

II. Description of the Prior Art

Currently, only the processes for thermal cutting of glass articles are known, in which the two thermal cuts are made separately, in different machines and with the article in a vertical position.

The first step consists of an operator placing the semi-finished article in the first cutting machine, with the article held by its enlarged, middle part or by its closed end on a rotating holding base, hereinafter, called an impeller, which employs a vacuum to perform its function, the lower excess part or open end of the article being downwardly positioned; the impeller is rotated by a transmission and has been preheated in order not to shatter the article; thereafter, a two-part burner is placed in proximity with or surrounds the excess lower part, said burner having a series of slots and/or apertures located about the perimeter of its inside diameter. A flame produced by the combustion of combustible gas and oxygen is forced through each slot. The burner also has adjustable guides for centering the article; said guides being of a suitable material, which will not shatter, crack or mark the glass product.

The burner heats an imaginary lower-cut line to bring the glass, plastic or like material to a definite temperature and at this moment the weight of the excess breaks the glass surface tension and such excess or surplus falls by gravity, thus completing the first cut. Thereafter, the burner is left in operation for a short lapse of time to smooth the cut end of the article and provide the final finish thereof. Next, the two-part burner is opened and withdrawn, leaving sufficient space to withdraw the article, the vacuum for retaining the article in the holder being cut off. Another operator transports the article to the second cutting machine, placing it on the impeller or rotating holding base. The article, this time, is located with the previously cut end facing upwardly, the excess upper part or closed end to be cut being directed downwardly.

At this stage a pneumatic cylinder located at the top of the machine lowers a tapering or centering device, which penetrates the end of the freshly cut article for centering same.

A two-part burner which also is provided with slots or apertures located about the inner periphery thereof for producing flames, resulting from the combustion of combustible gas and oxygen is moved to or locked in proximity to the depending upper excess part of the article. The burner heats the imaginary cutting line to bring it to a definite temperature and at this time the weight of the surplus breaks the glass surface tension, thus effecting the second cut. Next, the flame from the burner edges or rounds the cut article for a brief time, in order to attain a final smooth finish. The two-part burner is then opened and withdrawn and at the same time, the upper pneumatic cylinder removes the centering device, leaving sufficient space to remove the finished article.

These conventional cutting processes, which are known in the art, have the considerable disadvantage in that the two cuts must be performed with the article in a vertical position only, and also requires two machines, one for the first cut and one for the second cut.

Consequently, these conventional processes require a sizable investment in machinery, a considerable amount of labor and a series of expenses that increase the price of the finished product.

Furthermore even if it were possible to make both cuts by use of only one machine, as could be feasible if both excess ends would be at the same distance from the retained central part of the article, and also if certain modifications were made in the machine, it would still be necessary to make the cut in two stages, one for cutting the excess lower part and the other to cut the excess upper part, since it is necessary to make both cuts with the article vertically located and there would be no way to cut, pull and hold the cut off end for separation from the article and subsequent rejection.

On the other hand, no thought had been given to the idea that the cuts could be performed other than by the thermal cutting as is now possible with the present invention, because of use of a combination of holders for the excess parts, it is now possible to make the cuts both mechanically (e.g. with chisels or gravers) and electro-magentically (e.g. with laser beam) as well as by thermal cutting and with the article either in vertical or horizontal position.

SUMMARY OF THE INVENTION

All these disadvantages and inconveniences are overcome with our process and machine for simultaneously cutting both excess ends of the articles, according to the present invention whereby the cutting of the excess parts is made with the article in a vertical or a horizontal position, by means of rotary supports which slightly pull one or both excess parts, at a predetermined rate and that in this fashion the cut off parts are retained after cutting and then released to fall by gravity to the surplus collector.

Also, since with our process and machine, the cuts are made simultaneously in a single stage, and therefore it is now possible to function with a continuous manufacturing process with glassware forming machines which include, as one of the stations thereof, the cut-off machine of the present invention.

It is, therefore, an object of the present invention, to provide an improved process to simultaneously cut both excess ends of hollow articles of glass, plastic or the like, which is adaptable for use in continuous manufacturing processes.

It is another object of the present invention, to provide an improved process for the multiple simultaneous cutting of both excess ends of glass, plastic or the like articles, with the article in a vertical or horizontal position, in which one or both excess parts are pulled axially while cutting, in such a manner that they are retained and, then, after removing the article, the excess parts are released to fall by gravity to a surplus collector.

It is yet another object of the present invention, to provide an improved machine for the simultaneous cutting of both excess ends of hollow glass, plastic or the like articles, said machine being capable of being included as a station in continuous-production glassware forming machines.

It is a further object of the present invention, to provide an improved machine which will perform the double, simultaneous cutting of glass, plastic or the like articles, with the article in a vertical or horizontal position, in which a rotary holder slightly exerts an outward axially pull on one or both excess ends of the article, at a predetermined rate while being cut, in order that upon completion of the two cuts, the excess parts are retained by the holders until removal of the article from the machine, when said holders will release said excess parts to permit them to fall by gravity to the surplus collector.

These and other additional objects and advantages will become evident to those skilled in the art, from the following detailed description of the invention.

BRIEF DESCRIPTION OF THE DRAWINGS

In the preferred embodiment of the invention, the semi-finished article is located in a vertical position and thermal cutters and a single holder are used for the excess upper part.

Figure 1:
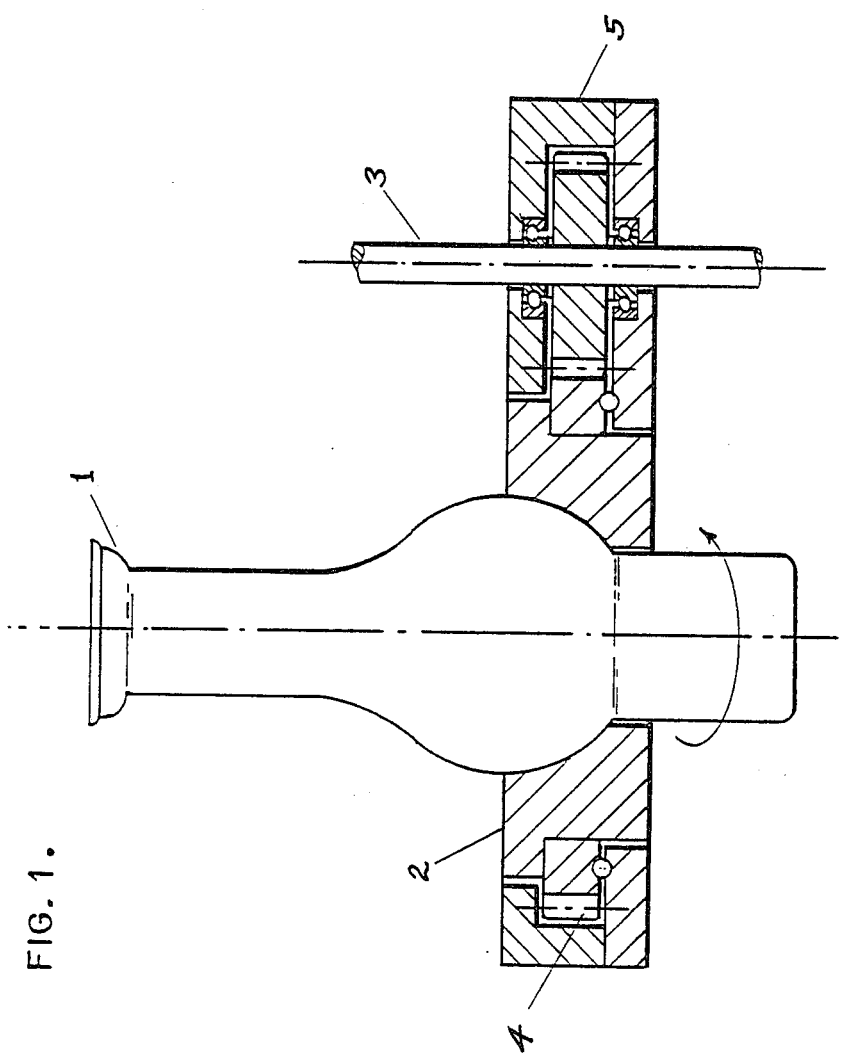
FIG. 1 is a view illustrating in longitudinal section, the rotating support base or impeller, supporting a semi-finished glass article at a predetermined temperature.
Figure 2:
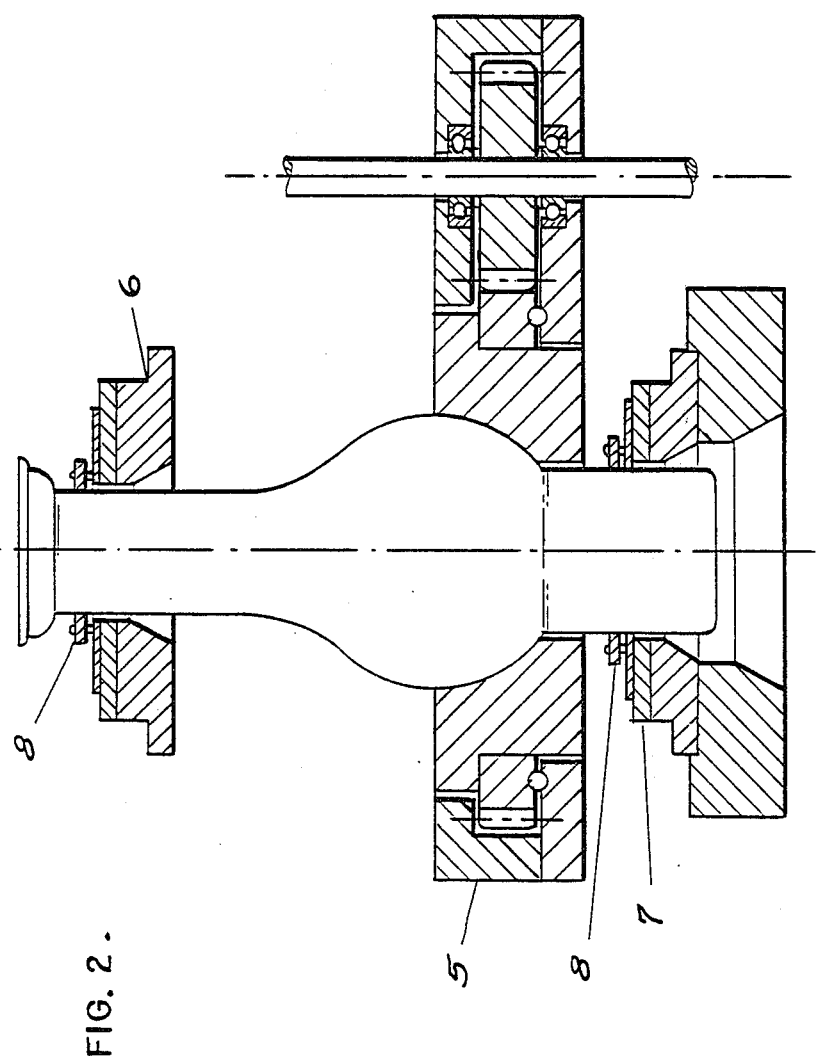
FIG. 2 is a view illustrating the cutters, in this instance, thermal cutters or burners, upper and lower, which have been moved into contact with or in close proximity to the article, illustrating the devices for centering the glass articles. The burners remain stationary while the article in the impeller continues rotation to maintain the temperature constant.
Figure 3:
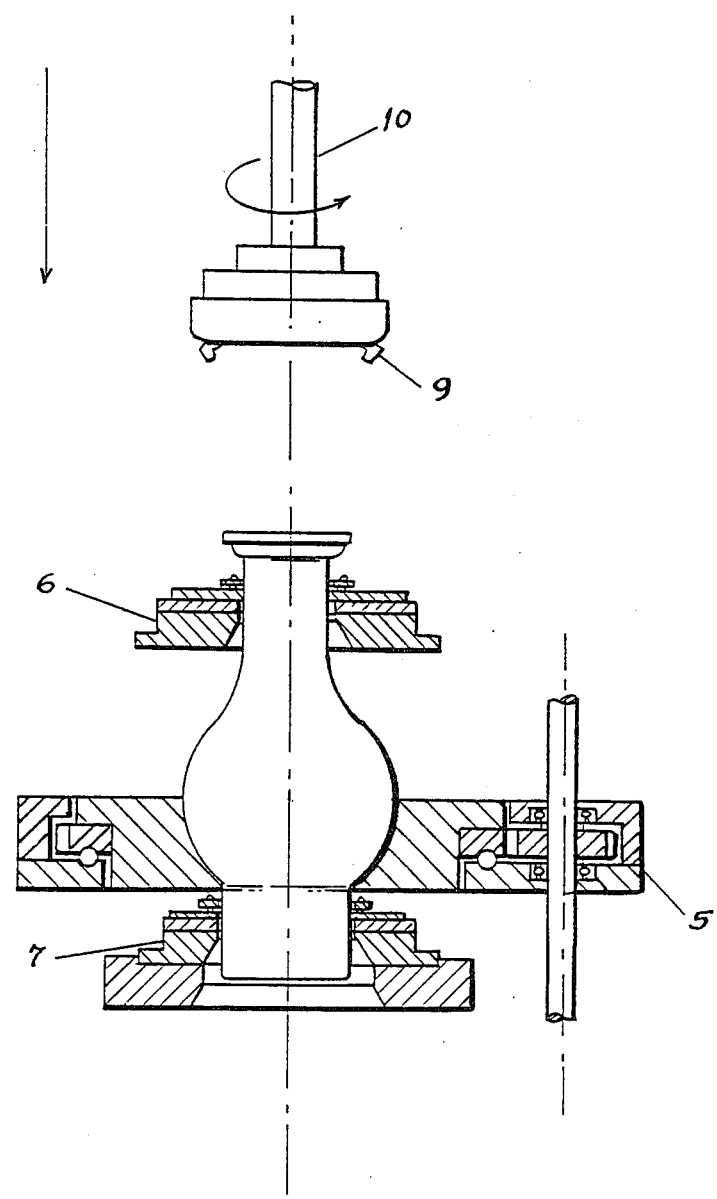
FIG. 3 is a view illustrating the holders, in this instance mechanical fingers located at the top, which are open and preparing to begin their downward movement to hold the glass article.
Figure 4:
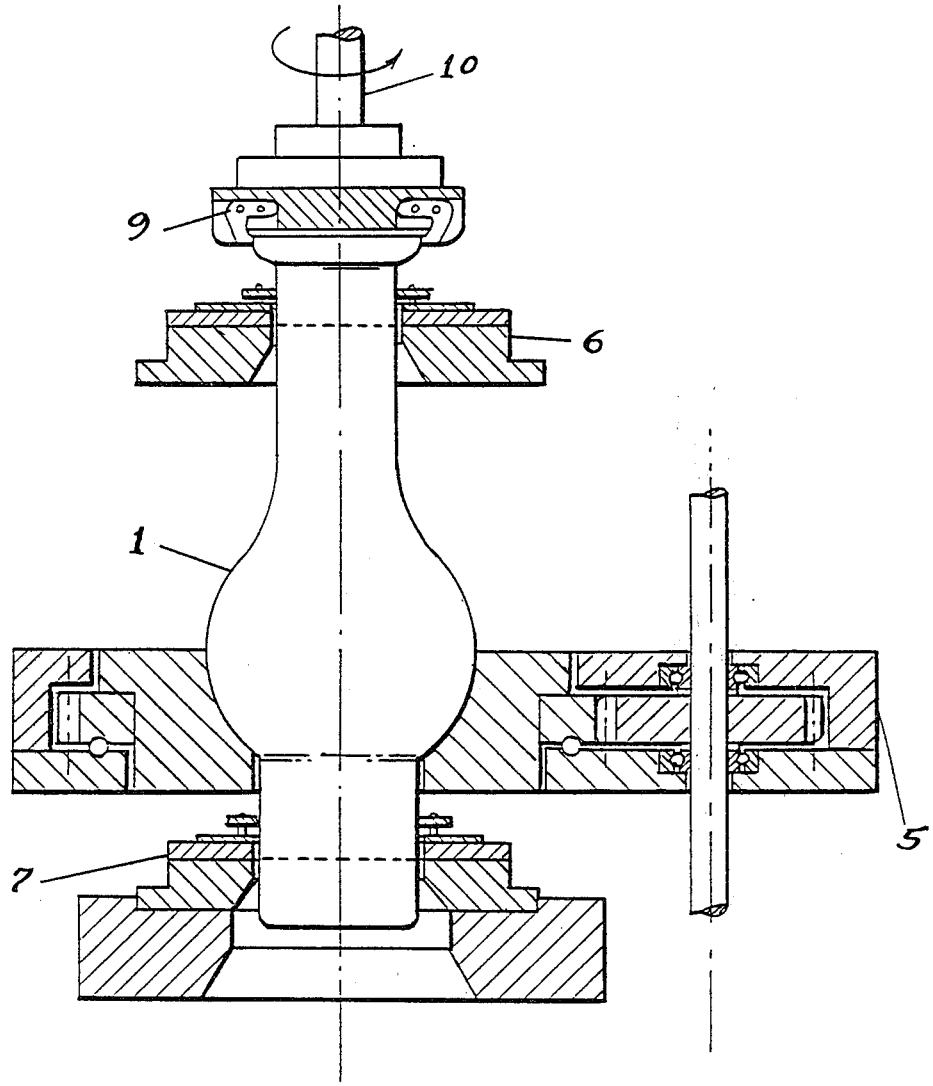
FIG. 4 is a view illustrating the mechanical fingers which have been completely lowered and closed to grip the glass article.
Figure 5:
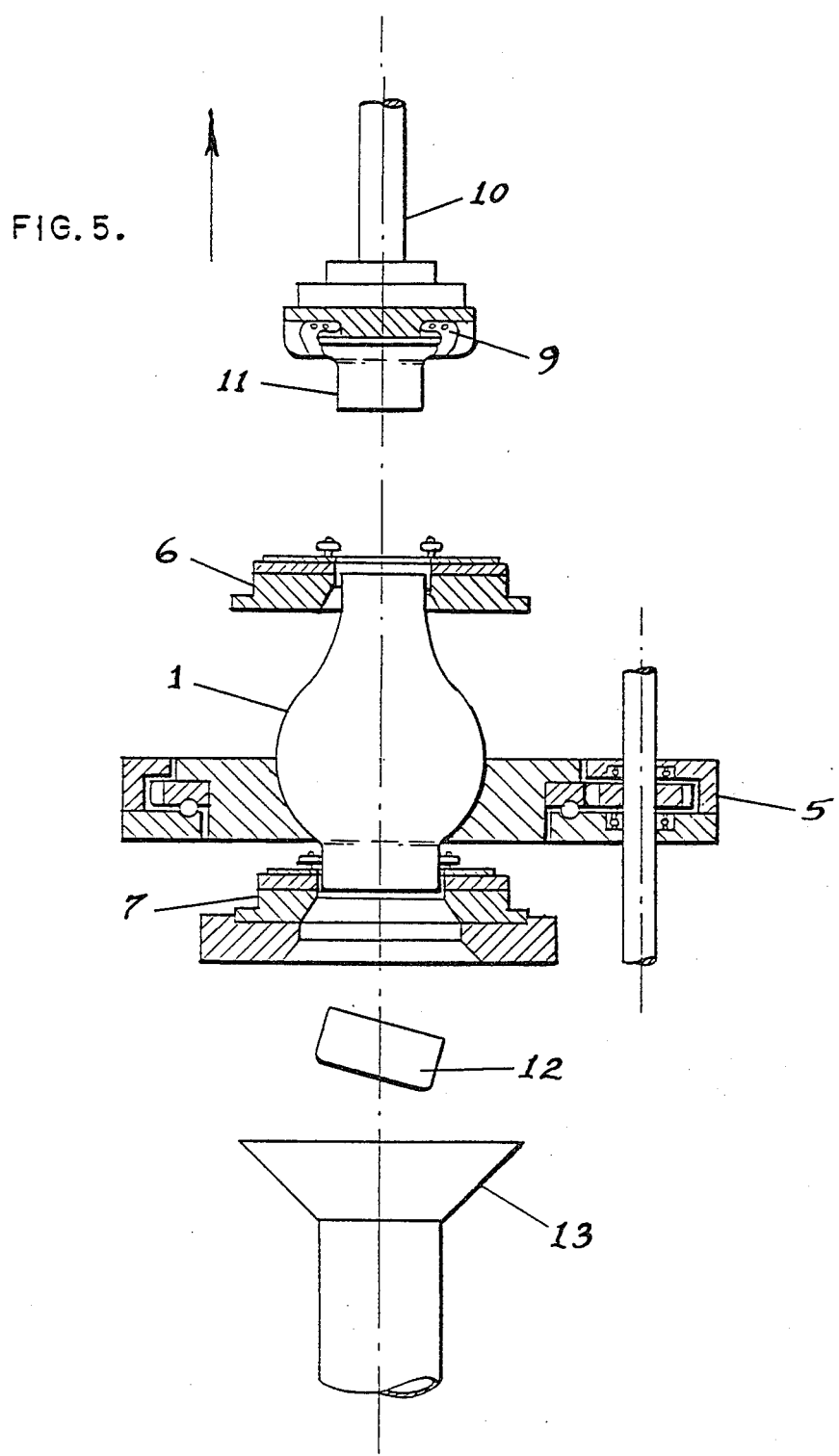
FIG. 5 is a view illustrating the mechanical fingers after drawing away the upper excess part of the glass article and making the cut; and at the same time the lower excess part drops by its own weight upon breaking the surface tension on the cutting line, due to the elevated temperature.
Figure 6:
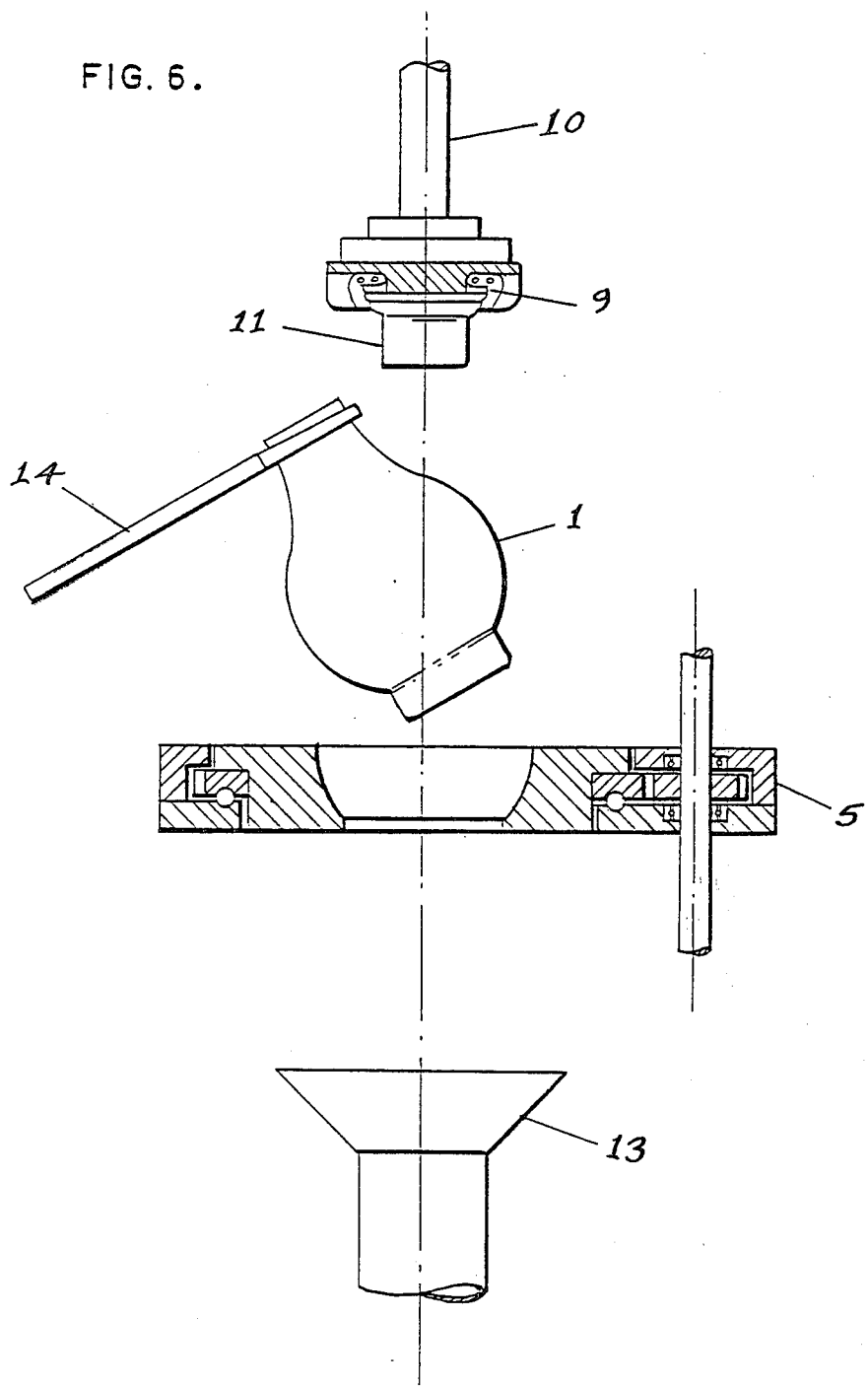
FIG. 6 is a view illustrating the finished article, at the time of removal. The upper excess parts remain retained by the mechanical fingers.
Figure 7:
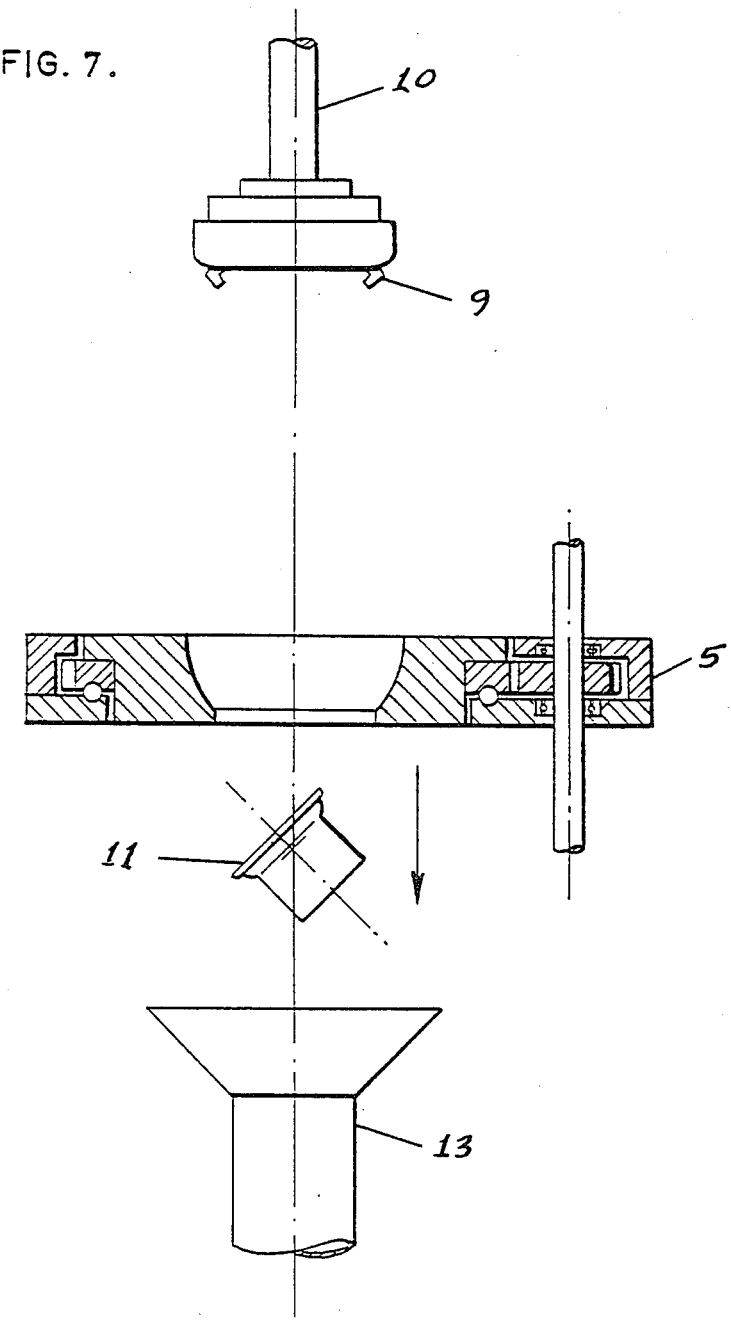
FIG. 7 is a view illustrating the mechanical fingers in an open position, to allow the upper excess part to drop freely to a collector composed of a duct leading to a scrap container.
Figure 8:
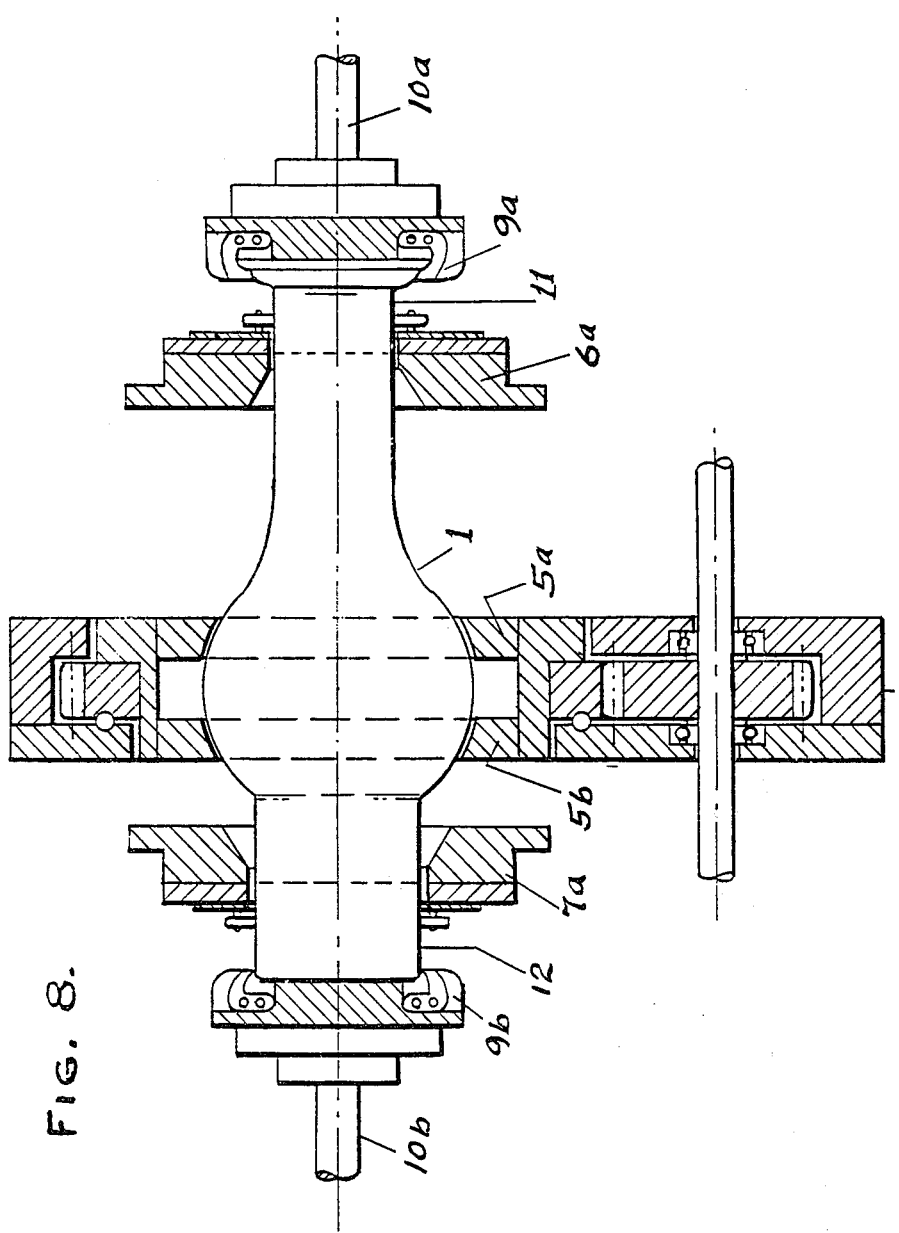
Figure 9:
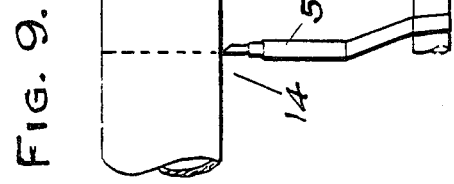

In a second embodiment the article is horizontally located and electro-magnetic cutters (laser beams) are used;

FIG. 8 is a view illustrating the article in a horizontal position and the mechanical fingers holding both excess parts and exerting an axial pulling thereof while being cut;

A third embodiment of the invention, applicable to the prior embodiments:

FIG. 9 illustrates a mechanical cutter (with a chisel or graver) by means of which any of the processes shown for the previous embodiments can be carried out.

DETAILED DESCRIPTION OF THE PREFERRED EMBODIMENTS

The invention will be described, firstly, with reference to the first embodiment shown in FIGS. 1 to 7, the same reference numerals being used for the same parts in the figures.

The machine for simultaneously cutting both excess ends of hollow articles of glass, plastic and the like, comprises a rotating support base 5, hereinafter called an impeller, which has a seat bushing 2 of insulating material and includes a shaft 3 to which is fixed a pinion 3' driving a ring gear 4 to impart rotation to the seat bushing 2; upper and lower two-part burners 6 and 7, which employ oxygen and gas, the upper burner 6 being located above the impeller and the lower burner 7, being located below the bottom of the impeller; guides 8 carried by the burners; a spindle 10 having mechanical fingers 9 and a duct 13 for surplus leading to a scrap container (not shown).

The process for simultaneously cutting both excess ends of hollow glass, plastic or the like articles consists of placing a semi-finished article 1 of definite temperature and weight, in a vertical position, on the impeller 5 and specifically, in the seat bushing 2, which is made of insulating material to prevent marking or shattering the article 1, with the lower excess part or closed end of the article extending below the seat bushing 2. The shaft 3 drives the ring gear 4 inside the impeller 5, through pinion 3' thus imparting rotation to the seat bushing 2 and, consequently to the article 1. Thereafter, the two burners 6 and 7 are moved into position about the article 1, said burners utilizing oxygen-gas, one for the upper excess part 11 of the article and the other for the lower excess part 12 thereof. Simultaneously with the locations of burners in operating position, the guides 8 are moved to center the article 1. Next, from the above there commences the downward stroke of the spindle 10 with the mechanical fingers 9 open and upon completion of the stroke of spindle 10, the mechanical fingers close, gripping the upper excess part of article 1; the burners heating along imaginary cutting lines on article 1 until the glass is brought to a definite temperature.

The spindle 10 commences to pull the upper excess part of article upwardly and the cut is completed due to the breaking of glass surface tension. Simultaneously, at the bottom of article 1, the lower excess part 12 detaches due to the action of gravity, thus effecting the cut and the lower excess part 12 drops into duct 13 which leads to the scrap container (not shown). Both cuts are rounded or edged, by permitting the article 1 to remain exposed to the burners which operate during a brief period of time and thus provide a better finish. The finished article 1 is removed from the impeller by prongs 14 coated with insulating material. Finally, the mechanical fingers 9 open and the upper excess part 11 drops into the duct 13 leading to the scrap container.

In the second embodiment of the invention which like the first, is within the scope of the invention, as shown in FIG. 8 of drawings, the machine of the present invention comprises two split or two-part rings 5a and 5b, supporting article 1 in a horizontal position; a pair of split cutters 6a and 7a which operate with laser beams, are located at the same height as the excess parts which it is desired to cut; guides 8a are included in the cutters and a pair of spindles 10a and 10b, each includes mechanical fingers 9a and 9b and a duct 13 for the scrap.

In this manner, the semi-finished article 1 is placed between the split rings 5a and 5b which close over the article 1 and cause it to rotate horizontally. At the same time, the split laser cutters 6a and 7a close about the excess parts 11 and 12, the spindles 10a and 10b move toward the article with closing fingers 9a and 9b to hold said excess parts 11 and 12 and are rotated in synchronism with the rotation of the split rings 5a and 5b. As the cuts are being made, the spindles 10a and 10b with their fingers 9a and 9b pull slightly on both excess parts 11 and 12 which, upon detaching from the article 1 after cutting, are held by the mechanical fingers 9a and 9b and when the finished article 1 is removed by the opening of rings 5a and 5b, said fingers release the excess parts 11 and 12 which will fall by gravity to the collector 13.

These tow embodiments of the invention may employ mechanical cutters, such as are illustrated in FIG. 9, said cutters consisting of an arm 5c having a chisel or graver 14, for cutting the excess parts 11 and 12.

Additionally, both the process and the machine of the present invention are capable of being included in forming processes and machines for the continuous production of articles.

Although the preceding description has been made with reference to certain specific embodiments of the invention, those skilled in the art should understand that any changes in form and detail of the invention will be comprised within the true spirit and scope thereof, as claimed in the appended claims.

What is claimed is:

1. A process for simultaneously cutting both excess end portions from hollow articles of glass, plastic and similar articles, and comprising in combination, the steps of: retaining and holding rotatably a semi-finished article by a portion intermediate its ends; rotatingly retaining and holding at least one of the excess end portions of the semi-finished article, in synchronism with the rotating retention and holding of the intermediate portion thereof; simultaneously cutting off both excess end portions of the article while exerting a slight pull at a predetermined rate of movement in synchronism with the cutting upon said at least one of the rotatingly retained excess end portions; and upon completion of the cutting stage, removing the finished article from its retainment, and then releasing the at least one excess end portion to drop into a scrap collector.

2. The process for simultaneously cutting both excess end portions of hollow articles of glass, plastic and similar articles, as set forth in claim 1, wherein heat is applied and both cuts are performed thermally.

3. The process for simultaneously cutting both excess end portions of hollow articles of glass, plastic and similar articles, as set forth in claim 1, wherein cutters are applied and both cuts are performed mechanically.

4. The process for simultaneously cutting both excess end portions of hollow articles of glass, plastic and similar articles, as set forth in claim 1, wherein laser beams are applied to effect both cuts electromagnetically.

5. The process for simultaneously cutting both excess end portions of hollow articles of glass, plastic and similar articles, as set forth in claims 1, 2, 3 or 4, wherein the semi-finished article is retained and held vertically and rotatingly by the portion intermediate its ends; wherein the upper excess end portion of the article is rotatingly held in synchronism with the rotating retension and holding of the intermediate portion thereof; and wherein the upper excess end portion of the article is slightly pulled upwardly at said predetermined rate of movement in synchronism with the cutting, in such a manner that when both cuts are completed the lower excess end portion drops by gravity to the scrap collector and the upper excess end portion is retained above the article and released to drop by gravity into the scrap collector after the finished article is removed from its retainment.

6. The process for simultaneously cutting both excess end portions of hollow articles of glass, plastic and similar articles, as set forth in claims 1, 2, 3 or 4, wherein the semi-finished article is retained and held horizontally and rotatingly by the portion intermediate its ends; wherein both excess end portions of the article are rotatingly held in synchronism with the rotating retension and holding of the intermediate portion thereof; wherein both retained excess end portions of the article are slightly pulled axially outwardly at predetermined rates of movement in synchronism with the cuts in such manner that upon completing both cuts both excess portions are held and retained away from the finished article and then released and dropped by gravity into the scrap collector after the finished article is removed from its retainment.

7. The process for simultaneously cutting both excess end portions of hollow articles of glass, plastic and similar articles, as set forth in claims 1 or 2, wherein heat is applied to both cut ends of the article simultaneously and the cut ends thermally edged thereby.

8. A machine for simultaneously cutting off both excess end portions of hollow articles of glass, plastic and similar articles, and comprising: a rotating support and retension base impeller suitable for locating and holding rotatingly a semi-finished article by a portion intermediate its ends; a pair of cutters located where the excess end portions join the intermediate portion and where desired to be cut; a scrap collector to receive the cut off excess end portions; at least one rotating holder rotating in synchronism with the retention base impeller and with means which holds and slightly pulls at a predetermined rate of movement and in synchronism with the cutting action at least one of the excess end portions of the article, in such manner that when both cutters finish cutting at least one of the excess end portions is retained by the holder while removing the finished article and then released to drop by gravity to the scrap collector.

9. The machine for simultaneously cutting both excess end portions of hollow articles of glass, plastic and similar articles, as set forth in claim 8, wherein the cutters are thermal cutters.

10. The machine for simultaneously cutting both axcess end portions of hollow articles of glass, plastic and similar articles, as set forth in claim 9, wherein the thermal cutters are two-part burners of semi-circular configuration, of the type which operate with combustible gas and oxygen.

11. The machine for simultaneously cutting both excess end portions of hollow articles of glass, plastic and similar articles, as set forth in claim 8, wherein the cutters are mechanical cutters.

12. The machine for simultaneously cutting both axcess end portions of hollow articles of glass, plastic and similar articles, as set forth in claim 8, wherein the cutters are graving chisels.

13. The machine for simultaneously cutting both excess end portions of hollow articles of glass, plastic and similar articles, as set forth in claim 8, wherein the cutters are electro-magnetical laser beam cutters.

14. The machine for simultaneously cutting both excess end portions of hollow articles of glass, plastic and similar articles, as set forth in any one of claims 8, 9, 10, 11, 12 or 13: wherein the retention base impeller vertically and rotatingly locates and holds the semi-finished article by the portion intermediate its ends; wherein a lower cutter is located where the lower excess end portion joins the intermediate portion it is desired to cut; a scrap collector in which the excess parts drop and are collected; wherein an upper cutter is located where the upper excess end portion joins the intermediate portion; the at least one rotating holder which turns in synchronism with the retention base impeller having means which holds and slightly pulls upwardly upon the upper excess end portion at a predetermined rate of movement in synchronism with cutting the article in such manner that when both cutters finish cutting the lower excess end portion drops by gravity to the scrap collector and the upper end portion remains retained by the holder which after removal of the finished article releases said upper excess end portion to drop by gravity through the retention base impeller to the scrap collector.

15. The machine for simultaneously cutting are both excess end portions of hollow articles of glass, plastic and similar articles, as set forth in any one of claims 8, 9, 10, 11, 12 or 13: wherein the retension base impeller horizontally and rotatingly locates and holds the semi-finished article by the portion intermediate its ends; wherein a pair of cutters located where each excess end portion joins the intermediate portion for cutting said excess end portions; a pair of rotating holders and one at each excess end portion and that turn in synchronism with the retention base impeller and each with means which holds and slightly pulls outwardly at a predetermined rate of movement and in synchronism with cutting the article in such a manner that when both cutters finish their cut, both excess end portions will detach and remain retained by the holder away from the finished article and released to fall by gravity into the scrap collector.

* * * * *